Feb. 3, 1931.  F. R. KLAUS ET AL  1,791,033
DUAL WHEEL CONSTRUCTION
Filed June 21, 1928  4 Sheets-Sheet 1
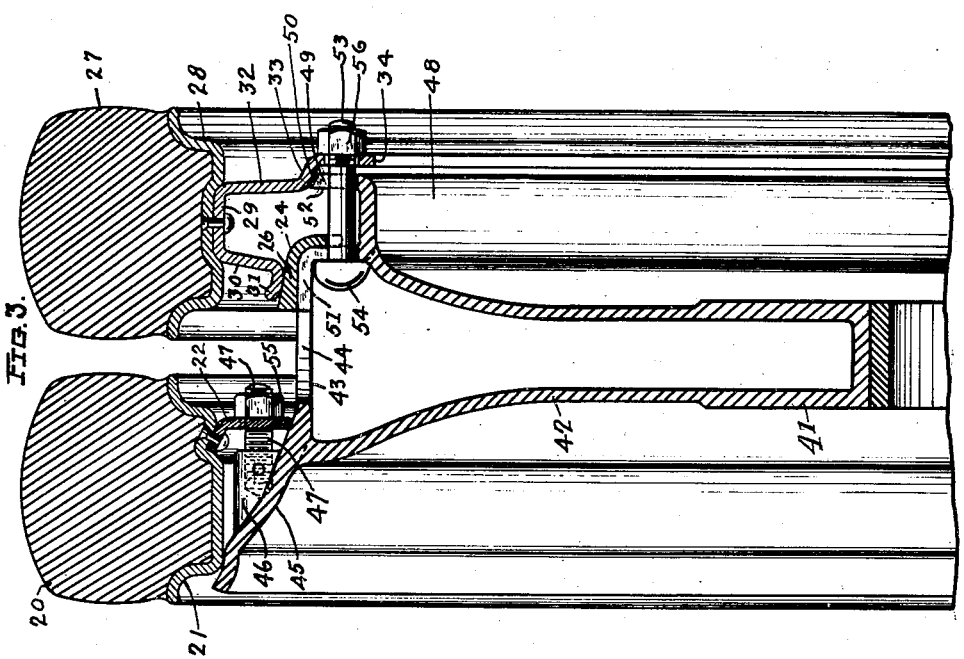
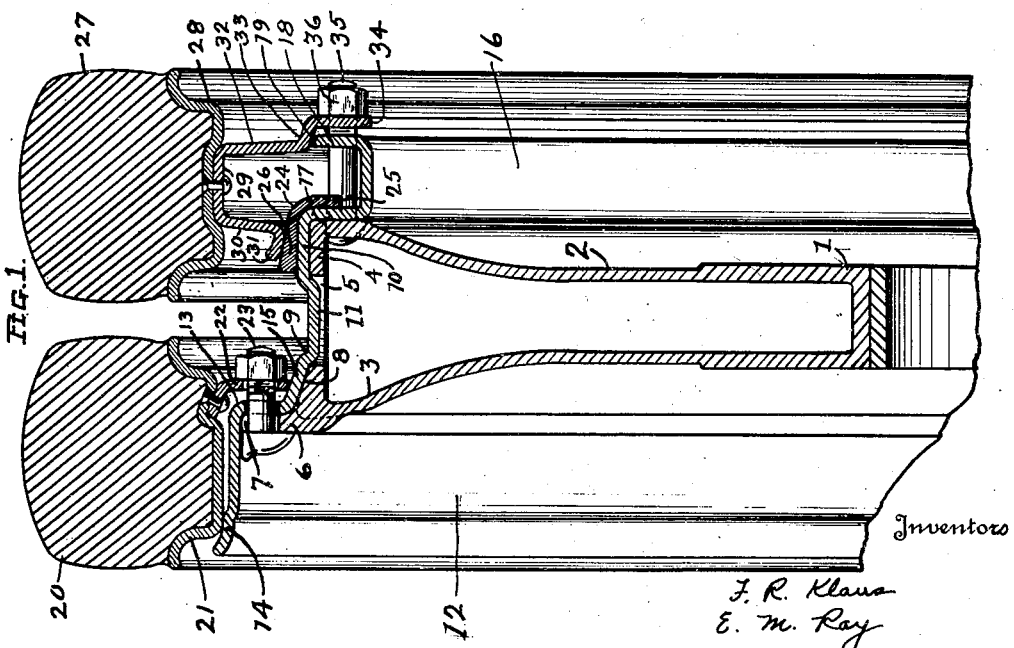
Inventors
F. R. Klaus
E. M. Ray
By Evans & McCoy
Attorneys

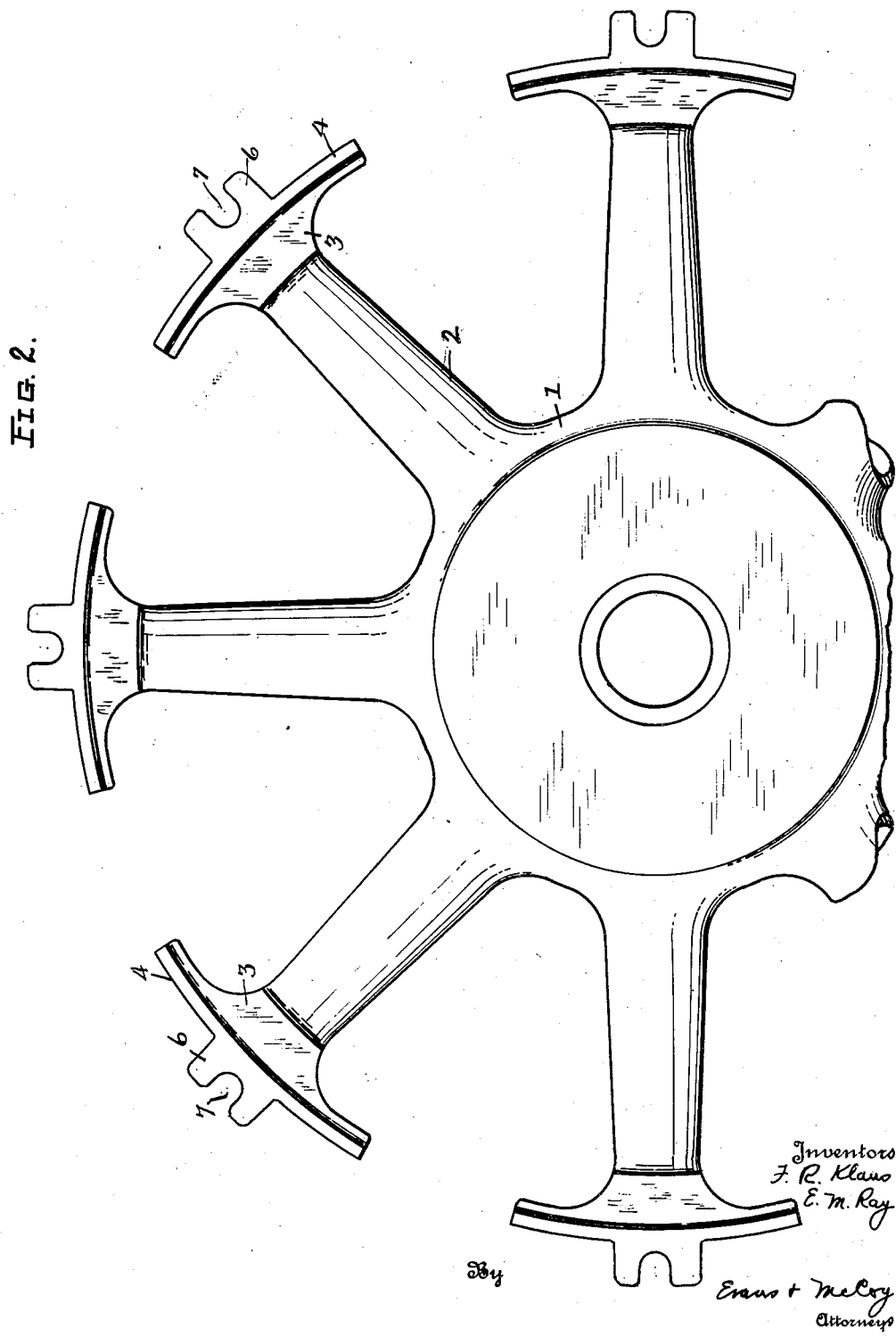

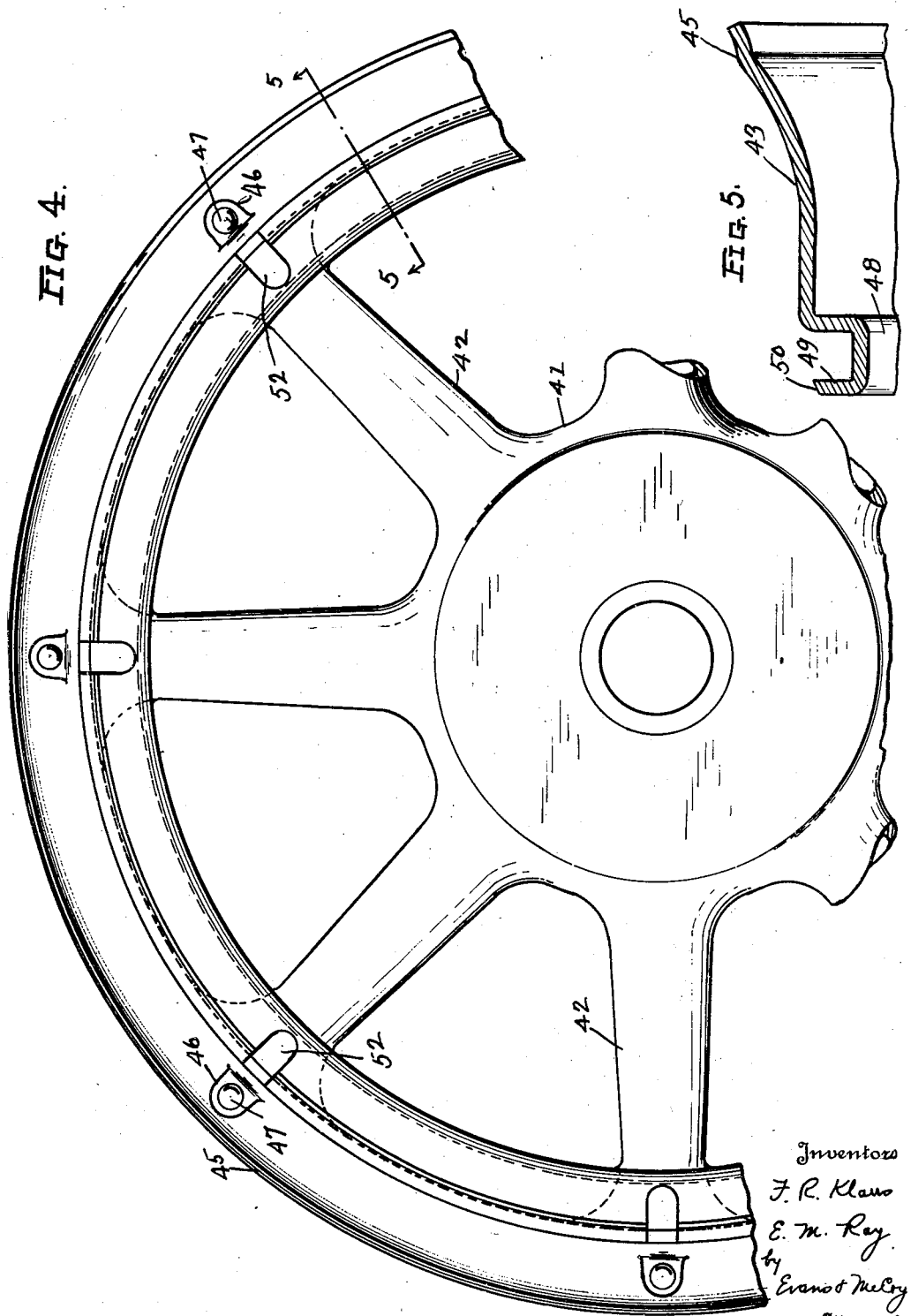

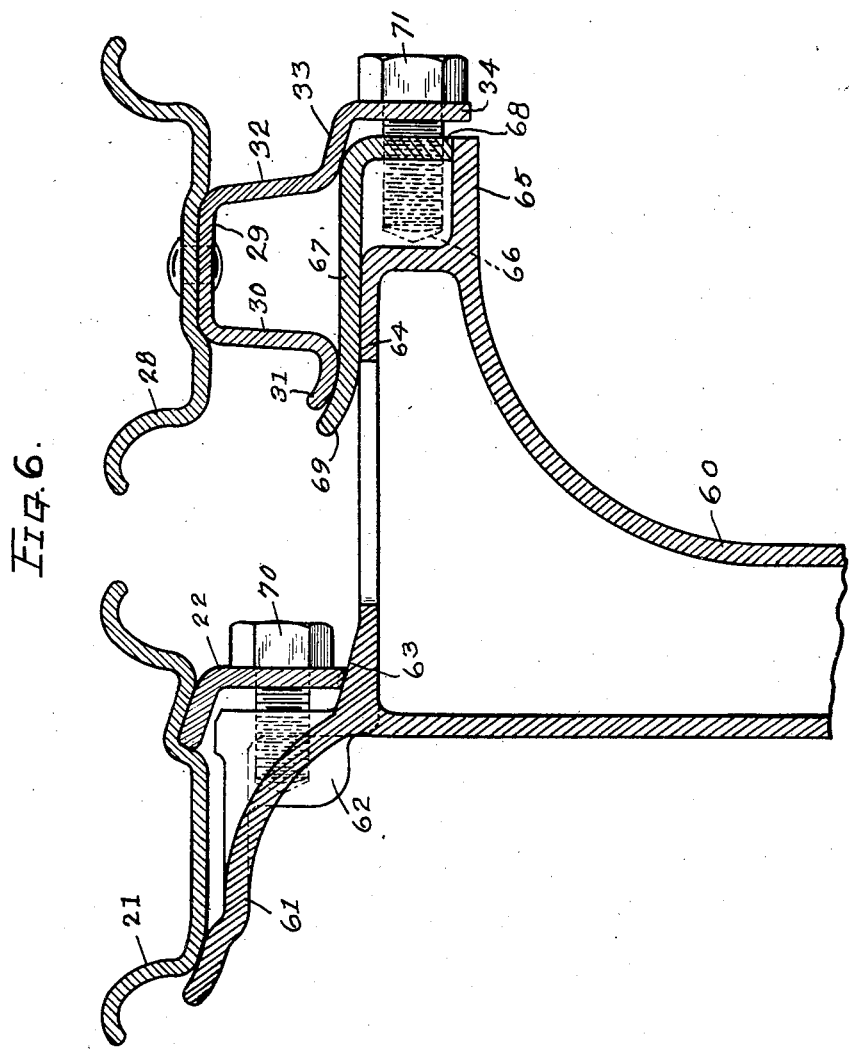

Patented Feb. 3, 1931

1,791,033

UNITED STATES PATENT OFFICE

FRED R. KLAUS AND EDWARD M. RAY, OF WARREN, OHIO, ASSIGNORS TO THE AMERICAN WELDING & MFG. COMPANY, OF WARREN, OHIO, A CORPORATION OF OHIO

DUAL-WHEEL CONSTRUCTION

Application filed June 21, 1928. Serial No. 287,272.

This invention relates to dual wheels for motor vehicles and has for its object to provide a metal wheel of rugged construction which is relatively light in weight and which can be manufactured at a relatively low cost.

A further object of the invention is to provide a dual wheel in which the rims or tire bases are independently secured to the body of the wheel by detachable fastening means so positioned as to be readily accessible and to provide a mounting for the tires permitting ready removal thereof upon detachment of the fastening members.

A further object of the invention is to provide means for mounting a pair of tire bases directly upon the spoke ends of a spider forming the body of the wheel.

An important feature of the present invention is the provision of a demountable mounting for a pair of cushion tires upon a wheel body by which each tire base is reinforced and rigidly supported on the wheel body throughout its periphery so that tire bases which are of relatively light weight and inexpensive to manufacture may be employed.

A further object is to provide a dual mounting for tire bases in which the clamping elements by which the inboard tire base is secured to the wheel body are arranged externally with respect to the seats for the outboard tire bases so as to be readily accessible from the outboard side of the wheel after removal of the outboard tire base.

A further object is to provide a dual mounting for tire bases in which both tire bases are maintained in wedging engagement with the wheel body by means of clamping bolts which directly engage members rigidly attached to the tire bases and thereby serve as driving lugs.

A further object is to provide a dual tire base mounting in which the tire bases are provided with internal supporting flanges through which the clamping bolts extend, the flanges being resilient and yieldable in a lateral direction so that they act as spring washers to lock the clamping nuts against inadvertent turning movements after they have been tightened against the flanges.

With the above and other objects in view, the invention may be said to comprise the wheel as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Figure 1 is a radial section showing construction of a dual wheel embodying the invention.

Fig. 2 is a plan view of the cast metal body of the wheel.

Fig. 3 is a radial section showing a modified construction.

Fig. 4 is a fragmentary plan view of the body of the wheel shown in Fig. 3.

Fig. 5 is a section taken on the line indicated at 5—5 in Fig. 4.

Fig. 6 is a radial section showing a modified construction.

As shown in the accompanying drawing, the body of the wheel is preferably in the form of a one piece casting having a hub portion 1 and radiating tubular spokes 2 which have flaring outer ends 3. Integral with the outer ends of the spokes, the wheel body is provided with arcuate circumferentially alined seating portions 4 which extend over the outer ends of the hollow spokes and project circumferentially toward adjacent spokes, the arcuate seating portions 4 being provided with apertures 5 centrally of the spokes through which the core sand may be discharged. Each of the arcuate seating portions 4 has a radially outwardly extending flange 6 at the inboard side thereof which is provided with a bolt receiving notch 7 and each of the seating portions 4 has a seat 8 tapering toward the outboard side of the wheel and extending from the inner sides of the apertures 5 to the flange 6.

A felloe band 9 of endless annular form is shrunk onto the seats 4 and has a central seating portion 10 which engages the seating portions 4 on the ends of the spokes and the seating portion 10 of the felloe band has indentations 11 which are formed therein as the band is being shrunk onto the spokes, these indentations extending into the apertures 5 and serving to lock the felloe band against lateral or circumferential movements on the wheel body. The band 9 is considerably wider than the peripheral seats of the wheel body upon which it is mounted and it is provided at its inboard side with a radially outwardly offset flange 12 which bears upon the edges of the flanges 6 of the wheel body and projects past the inboard side of the wheel body. Between the seating portion 10 of the felloe band and the inboard flange 12 thereof, the band is provided with a shoulder 13 which bears against the inner faces of the flanges 6 of the wheel body and the outer edge portion of the flange 12 is formed to provide a tapering seat 14.

The seating portion 10 of the felloe band is also provided with a tapering portion 15, between the shoulder 13 and indentations 11, which fits upon the tapering portions 8 of the peripheral seats 4 of the wheel body. At its outboard edge, the felloe band is provided with a radially inwardly offset channel 16 which provides an inner shoulder 17 bearing against the outboard faces of the spoke ends and an outer annular flange 18, the edge of which is formed to provide a tapering external seat 19. The felloe band 9 provides seats for the inboard and outboard tire units of the dual wheel, the inboard tire 20 being provided with a base or rim 21 which, when secured in place, rests at its inboard edge on the tapering seat 14 of the flange 12. The tire base 21 is provided adjacent its outboard edge with a continuous radially inwardly projecting annular mounting flange 22, the exterior edge of which is rigidly secured to the interior of the tire base and is adapted to bear upon the tapering seat portion 15 of the felloe band. The tire base 21 is secured upon the felloe band by means of bolts 23 which extend through the notches 7 of the flanges 6, the shoulder 13 of the felloe band and the inwardly projecting mounting flange 22 of the rim. By tightening the nuts on the bolts 23, the tire base 21 is forced laterally toward the inboard side of the wheel, causing the inboard shoulder of the tire base which engages the seat 14 and the flange 22 which engages the seat 15 to move into tight wedging engagement with the seats.

The mounting flange 22 is in the form of an endless ring made from a rolled section and projects inwardly from the interior of the tire base in substantially a vertical plane. This flange tightly fitting within and rigidly secured to the interior of the tire base greatly stiffens the tire base against radial or torsional distortion and provides a continuous and very rigid support for the outer portion of the tire base. The flange 22, however, has some lateral flexibility and the resiliency and lateral flexibility of the flange is taken advantage of to increase the radial outward thrust on the interior of the tire base and to provide a lock for the clamping nuts.

The internal diameter of the flange 22 is such that, when the tire base is slipped into place on the wheel to a position in which the inboard shoulder of the tire base engages its seat, the internal edge of the flange 22 is slightly spaced from its seat. As the clamping nuts on the bolts 23 are tightened, the flange 22 is first bent inwardly into engagement with the tapered seat 15 and, upon further tightening of the nuts, the pressure against the outer face of the flange tends to move the flange to vertical position about its seat engaging edge as a fulcrum, which movement tends to expand the flange and create an outward radial pressure against the interior of the tire base. At the same time, the lateral pressure of the nuts is transmitted directly to the interior beveled edge of the flange and through the tire base rigidly connected to the flange to the inboard seating shoulder so that the tire base and flange are tightly wedged upon the tapered seats 14 and 15.

Since the clamping bolts 23 are passed through the mounting flange 22 which is rigidly secured to the interior of the tire base, the clamping bolts serve as driving lugs to transmit driving thrusts to the tire base and prevent circumferential slip between the tire base and wheel body.

By reason of their resiliency, the flanges 22 maintain an outward thrust on the clamping nuts which prevent inadvertent turning of the nuts after they have been tightened, the flange acting on each nut in a manner of a spring lock washer.

For mounting the outer tire, a ring 24, which is angle shaped in cross section and which may be transversely split to facilitate its mounting on the felloe band, fits upon the shoulder portion of the band over the outboard edge portions of the spokes. The ring 24 has an inwardly projecting flange 25 which bears against the inner wall of the channel 16 and a tapering flange 26 which bears upon the central seating portion 10 of the felloe band and forms a tapering seat over the outboard edge portions of the wheel body. The outboard tire 27 has a base 28 to the interior of which is rigidly attached a continuous channel shaped adaptor ring 29 which has an inboard flange 30, the free edge 31 of which is bent laterally to provide an annular internal bearing surface for engagement with the tapering flange of the seating ring 24. The channel adaptor ring 29 has an outboard flange 32 which is of greater length than the flange 30 and this flange has a laterally offset portion 33 forming a tapered internal shoulder for engagement with the tapered edge 19 of the flange 18 of the felloe band, the interior edge portion of the flange 32 overlying the outboard flange 18 of the felloe band.

The outboard tire base is secured in place by bolts 35 which extend through the outboard walls of the tubular spokes through the inner wall and outer flange of the channel 16 and through the edge portion 34 of the flange 32. The nuts 36 are threaded upon the outer ends of the bolts 35 and, by screwing these nuts inwardly on the bolts, the adapter ring 29 and tire base 28 are forced laterally toward the inboard side of the wheel, causing the seating edge 31 of the adaptor ring to move into tight wedging engagement with the inclined seat 26.

The channel shaped adaptor ring 29 which fits tightly within and is rigidly attached to the interior of the tire base greatly strengthens the tire base and the inwardly projecting flanges 30 and 32 provide continuous rigid supporting and spacing members so that a very rigid support is provided for the cushion tire, holding the tire base securely against radial distortion.

The flanges of the adaptor ring flare inwardly, the flanges being oppositely inclined and each inclined slightly with respect to the vertical. The flanges 30 and 32 are resilient and may be flexed slightly under the pressure of the clamping nuts to engage and conform to the seats. The lateral pressure applied to the adaptor ring 29 in forcing the same laterally onto the seats tends to spring the flanges 30 and 32 toward vertical position and thereby expand the ring against the interior of the tire base thus exerting a radial outward thrust upon the tire base throughout its circumference to more rigidly support the same.

The resiliency of the outboard flange causes an outward pressure to be maintained against the inner faces of the clamping nuts which prevents inadvertent turning of the nuts after they have been tightened, the resilient flange acting upon each nut in a manner similar to a spring lock washer.

The bolts 35 being passed through the outer flange of the adaptor ring which is rigidly secured to the tire base, serve as driving lugs to transmit driving thrusts from the wheel body to the tire base and prevent circumferential slip between the tire base and wheel body.

By removing the nuts 36, the outboard tire 27 is freed from the wheel body and may be readily removed. When the outboard tire 27 is removed, the retaining nuts on the bolts 23 are readily accessible so that they may be readily removed to free the inboard tire 20 from the felloe band. The internal diameter of the attaching flange 22 of the inboard tire base is greater than the external diameter of the seating portion 10 of the felloe band so that when the retaining nuts are removed, the inner tire base can be readily removed from the wheel.

Figs. 3, 4 and 5 of the drawing show dual wheel in which the tires and tire bases may be identical with the tires and tire bases in the modification shown in Figs. 1 and 2 and, in these figures, the tires and tire base elements are designated by the same reference numerals as in Figs. 1 and 2. Figs. 3, 4 and 5, however, show a modified wheel body structure in which the wheel body is in the form of a one piece casting having a hub portion 41 and radiating spokes 42, upon the outer ends of which there is formed an integral felloe 43 which has a central seating portion similar to that provided by the felloe band 9 above described and which is provided with openings 44 centrally over the ends of the spokes through which the core sand may be discharged from the interior of the wheel body.

The integral felloe 43 has a laterally projecting inboard flange 45, the exterior face of which tapers toward the outboard side of which tapers toward the outboard side of the wheel and which is provided upon its exterior face opposite the end of each spoke with an integral boss 46 to each of which is rigidly attached a bolt 47 which projects from the boss toward the outboard side of the wheel. At the outboard edge thereof, the integral felloe is formed with a radially inwardly offset annular channel 48, the outer wall of which is formed by a continuous outwardly projecting flange 49, which has its edge formed to provide a tapering seat 50. The felloe is provided with a notch 51 extending from each of the openings 44 to the channel and, inwardly of the inner wall of the channel 48, the flange 49 is provided with notches 52 in alinement with the notches 51. The notches 51 and 52 are adapted to receive bolts 53, each bolt having a head 54 which engages the inner face of the outboard wall of a spoke adjacent the outer end thereof. The bolts 47 and 53 are thus mounted on the wheel in substantially the same positions which the corresponding bolts 23 and 35 occupy in the modification first described. The bolts 47 extend through the flange 22 of the inner tire base 21 and receive fastening nuts 55 by means of which the inboard tire base is tightened on the felloe.

As in the modification first described, a seating ring 24 is mounted upon the shoulder at the inner side of the channel 48 and the outboard tire base 28 is secured in place by means of nuts 56 on the outer ends of bolts 53 which engage with the inner portion 34 of the flange 32 of the adaptor ring to force the adaptor ring and outboard tire base into wedging engagement with the seat 26.

In Fig. 6 of the drawing, there is shown a modified form of the invention in which the same tire base units are employed as in the modifications previously described. In this modification, a one-piece cast wheel body 60 is provided with an outwardly flaring flange 61 which forms the external seat for the inboard shoulder of the tire base 21 and at intervals about the circumference of this flange, there are integrally formed bolt receiving bosses 62. On the periphery of the wheel body adjacent the flange 61, there is formed a tapering exterior conical seat 63 adapted to receive the interior edge of the mounting flange 22 of the tire base 21.

To the outboard side of the seat 64, the periphery of the wheel body is formed to provide a cylindrical exterior seating surface 64 and spaced radially inwardly from the seating portion 64 along the outboard edge of the peripheral portion of the wheel, there is an outwardly projecting flange 65. Upon the flange 65 at suitably spaced points are formed integral bolt receiving bosses 66. A removable seating ring 67 which is angle shaped in cross section fits over the shoulder at the outboard edge of the seating portion 64, the ring 67 fitting upon the seating surface 64 and having an inwardly extending flange 68 overlying the outer faces of the bosses 66. At its inner edge, the ring 67 has an outwardly tapering portion 69 which provides a wedging seat for the inner flange 30 of the adaptor ring 29 and the shoulder at the outer edge of the ring 67 provides a seat for the internal shoulder 33 of the flange 32. The bosses 62 are bored and tapped to receive tap bolts for clamping the inner tire base and the bosses 66 are bored and tapped to receive tap bolts 70 for clamping the outer tire base, the clamping action being substantially the same as in the modifications previously described.

It will be apparent that in all of the modifications above described, we have provided a dual wheel of simple and rugged construction and relatively light in weight. Furthermore, we have provided a mounting for the tire bases which greatly facilitates the mounting of the tire bases on the wheel body and the detachment of the tire bases from the wheel body. It will also be noted that each tire base is provided with separate attaching means by which it may be securely and rigidly mounted on the wheel body and that the attaching means for the two tire bases are so disposed that each is readily accessible in the mounting and demounting of the tire bases.

It will also be apparent that in all modifications the inboard and outboard tire bases are independently clamped upon the wheel body and that the clamping elements of the inboard tire base are all exterior to the peripheral seating portions of the wheel body upon which the outboard tire base is mounted so that the clamping elements of the inner tire base are conveniently accessible whenever the outboard tire base has been removed from the wheel. Furthermore, this arrangement permits the use of short clamping bolts for directly clamping each tire base thus greatly simplifying and making more rigid the mounting of the individual tire bases.

The mounting flange 22 and adaptor ring 29 may be readily applied to tire bases of different widths so that tires of a size suitable for trucks of different load capacities may be mounted upon the same wheel body. It will therefore be apparent that the dual mounting of the present invention will enable a single standard wheel to be used with tire bases of different widths so that it is unnecessary to provide a different wheel for each size of tire.

Furthermore, it is to be understood that the particular form of apparatus shown and described, and the particular procedure set forth, are presented for purposes of explanation and illustration and that various modifications of said apparatus and procedure can be made without departing from our invention as defined in the appended claims.

What we claim is:

1. A cast metal wheel body comprising a hub portion, and radiating hollow spokes having enlarged outer ends with arcuate circumferentially alined portions extending over the outer ends thereof, forming felloe receiving seats, said seat portions having radially outwardly projecting circumferentially alined attaching flanges along one edge thereof, in combination with a felloe engaging said seats, said felloe having flanges projecting laterally from opposite sides of said body, said felloe having shoulders engaging said radially outwardly projecting flanges of the body and having shoulders engaging the outboard sides of said spokes.

2. A dual wheel comprising a body having a hub portion and radially extending spokes, a felloe seated on the outer ends of said spokes, said felloe having a laterally projecting inboard edge portion offset radially outwardly with respect to said spoke ends and a laterally projecting outboard edge portion offset radially inwardly with respect to said spoke ends, said felloe being adapted to receive tire bases detachably mounted on the inboard and outboard portions of said felloe.

3. A dual wheel comprising a body having a hub portion and radially extending spokes, a felloe having a central spoke engaging portion seated on the outer ends of said spokes, said felloe having a shoulder adjacent the inboard side of said spoke ends and a laterally extending flange having a seating portion tapering toward the outboard side thereof, said felloe also having along its outboard side a radially inwardly offset channel forming a shoulder engaging the outboard faces of the spokes, a ring which is angle shaped in cross section and has a flange engaging the inner wall of said channel and a flange overlying the spoke engaging portion of the felloe, the latter flange having an outer face tapering toward the outboard side of the wheel forming a seat, said felloe being adapted to receive inboard and outboard tire bases engaging the tapered seats on said felloe flange and ring flange, respectively, and means for securing said tire bases in place on the felloe and for forcing the same laterally on said tapering seats.

4. A wheel body having a felloe portion provided with a central peripheral seating portion and circumferential seating flanges projecting laterally from opposite sides of the wheel body, the inboard flange being offset radially outwardly with respect to the central seating portion and the outboard flange being offset radially inwardly with respect to said central seating portion, said flanges and central seating portion having tapering shoulders for wedging engagement with inboard and outboard tire bases.

In testimony whereof we affix our signatures.

FRED R. KLAUS.
EDWARD M. RAY.